US009932503B2

(12) United States Patent
Harrington et al.

(10) Patent No.: US 9,932,503 B2
(45) Date of Patent: Apr. 3, 2018

(54) ADHESIVE COMPOSITIONS

(71) Applicant: Hexcel Composites Limited, Duxford (GB)

(72) Inventors: Chris Harrington, Duxford (GB); Vaida Burton, Duxford (GB)

(73) Assignee: Hexcel Composites Limited, Duxford (GB)

( * ) Notice: Subject to any disclaimer, the term of this patent is extended or adjusted under 35 U.S.C. 154(b) by 0 days.

(21) Appl. No.: 15/315,918

(22) PCT Filed: Jun. 30, 2015

(86) PCT No.: PCT/EP2015/064881
§ 371 (c)(1),
(2) Date: Dec. 2, 2016

(87) PCT Pub. No.: WO2016/001245
PCT Pub. Date: Jan. 7, 2016

(65) Prior Publication Data
US 2017/0107409 A1  Apr. 20, 2017

(30) Foreign Application Priority Data
Jun. 30, 2014  (GB) .................................. 1411586.9

(51) Int. Cl.
*C09J 163/00* (2006.01)
*C09J 109/02* (2006.01)
(Continued)

(52) U.S. Cl.
CPC .......... *C09J 163/00* (2013.01); *C08G 59/182* (2013.01); *C08G 59/3227* (2013.01); *C08G 59/50* (2013.01); *C08G 59/686* (2013.01); *C08J 5/24* (2013.01); *C09J 5/06* (2013.01); *C08G 59/4253* (2013.01); *C08J 2363/00* (2013.01)

(58) Field of Classification Search
CPC ..... C08L 63/00–63/10; C09D 163/00–163/10; C09J 163/00–163/10; C09J 109/02; C09J 121/00; C09J 5/06; C08J 5/24; C08J 2363/00–2363/10;
(Continued)

(56) References Cited

U.S. PATENT DOCUMENTS 4,047,498 A * 9/1977 Wood ........................ B05C 5/02
118/243
4,803,232 A    2/1989 Shah
(Continued)

FOREIGN PATENT DOCUMENTS

| EP | 0284564 A2 | 9/1988 |
| WO | 2008016889 | 2/2008 |
| WO | 2010039614 | 4/2010 |

OTHER PUBLICATIONS

CVC Thermoset Specialties, Omicure U-52 and U-52M Data Sheet (2006).*

*Primary Examiner* — Kregg T Brooks
(74) *Attorney, Agent, or Firm* — W. Mark Bielawski; David J. Oldenkamp

(57) ABSTRACT

An adhesive composition comprising an aromatic epoxy resin, an epoxy resin rubber adduct, an amine curing agent; and optionally one or more of an oil absorbent, a corrosion inhibitor and a urone accelerator, wherein the adhesive composition is curable at 150° C. in no more than 210 seconds.

16 Claims, 1 Drawing Sheet

Figure 1:
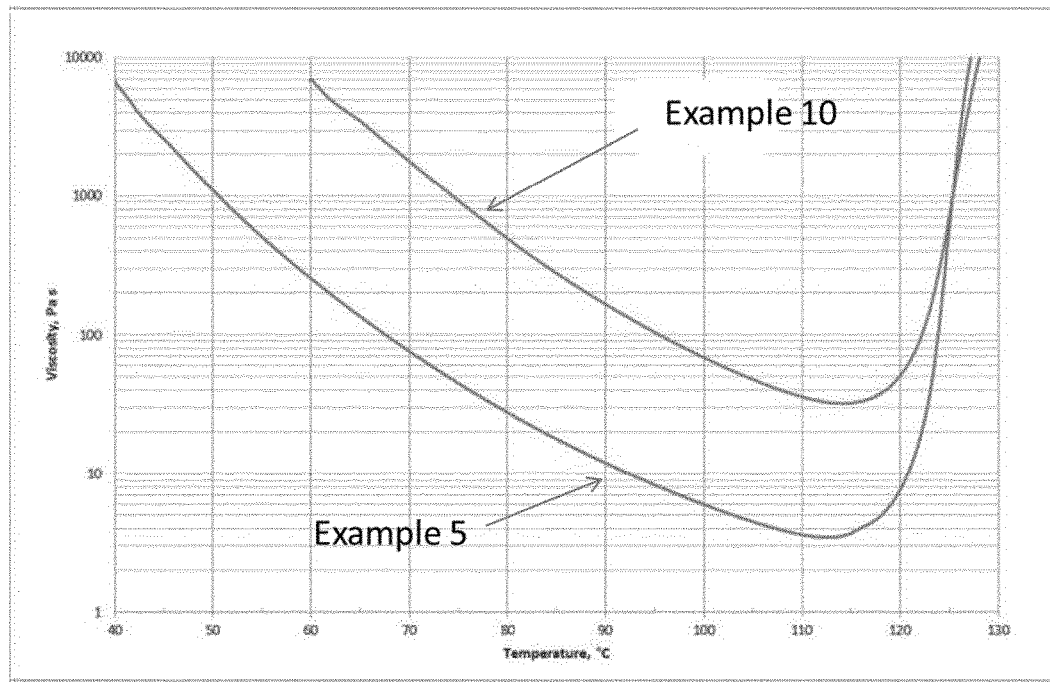

(51) Int. Cl.

| | |
|---|---|
| *C09J 5/06* | (2006.01) |
| *C09J 11/04* | (2006.01) |
| *C09J 11/06* | (2006.01) |
| *C09J 121/00* | (2006.01) |
| *C09J 163/02* | (2006.01) |
| *C09J 11/08* | (2006.01) |
| *C09J 131/04* | (2006.01) |
| *C09J 163/04* | (2006.01) |
| *C08G 59/50* | (2006.01) |
| *C08G 59/02* | (2006.01) |
| *C08G 59/18* | (2006.01) |
| *C08G 59/20* | (2006.01) |
| *C08G 59/32* | (2006.01) |
| *C08G 59/56* | (2006.01) |
| *C08G 59/68* | (2006.01) |
| *C08J 5/24* | (2006.01) |
| *C08K 3/26* | (2006.01) |
| *C08K 3/32* | (2006.01) |
| *C08L 63/00* | (2006.01) |
| *B32B 15/092* | (2006.01) |
| *B32B 27/00* | (2006.01) |
| *B32B 27/38* | (2006.01) |
| *B32B 7/12* | (2006.01) |
| *C08G 59/42* | (2006.01) |

(58) Field of Classification Search
CPC ..... C08G 59/50; C08G 59/182–59/186; C08G 59/686; C08G 59/4253
See application file for complete search history.

(56) References Cited

U.S. PATENT DOCUMENTS

| | | | |
|---|---|---|---|
| 4,908,273 A * | 3/1990 | Urech | B32B 27/38 156/330 |
| 2008/0308212 A1 | 12/2008 | Sheasley et al. | |
| 2011/0098382 A1* | 4/2011 | Czaplicki | C08G 59/186 523/453 |
| 2013/0115442 A1* | 5/2013 | Sang | C08G 59/4253 428/327 |

* cited by examiner

ADHESIVE COMPOSITIONS

FIELD OF INVENTION

The present invention relates to an adhesive composition and a method for curing the adhesive composition, a cured product obtained therefrom, a method of making a composite article, a composite article obtained therefrom, and a prepreg comprising the adhesive composition.

BACKGROUND OF THE INVENTION

The joining of materials during the manufacture of structures is best achieved through careful cleaning and surface preparation of the substrate. Particularly undesirable surface contaminations include oils that can be found on many metallic components. Such oils can be on a substrate as a consequence of transfer from an upstream process step, such as hydraulic oil from a metal rolling process or slipping oil to aid metallic shaping during pressing and even for corrosion inhibition of ferric metals.

In industrial manufacture the cleaning of the substrates often requires an additional step during the manufacturing process, any such step will by necessity either increase the process complexity, process time, process cost, or all three.

In traditional automotive structure manufacture the problem has been overcome by addition of modifiers to thermosetting adhesives that either adsorb residual oil or use surfactants to perform a chemical substrate de-oiling step as part of the cure process. Either approach uses high curing temperatures of about 180° C. and over an hour in drying ovens.

These relatively high cure temperatures and long durations allow the required joining process to take place. High temperatures provide a low viscosity to enable oil transfer away from the surface. Long duration kinetically allows oil sequestration before the adhesive begins to bond to the metal substrate. This approach achieves the necessary task of curing the adhesive during a required part of the process and necessitates some mechanical fastening until the cure has taken place. Fastening can include local welding or riveting but the use of external clamping is generally considered unworkable.

Epoxy resin based adhesives are widely used for bonding various substrates because of their good bonding strength and versatility. Two-component epoxy resin based adhesive systems in which an epoxy resin in combination with a separate hardener are mixed shortly before use are particularly well-known in the art. However, in such an application the two components (and sometime more than two components) have to be properly measured and thoroughly mixed shortly before use because the epoxy resin component and the hardener component react to form a solid after standing at ambient temperatures for relatively short periods of time, on the order of several minutes to several hours. This poses a problem for large volume industrial applications as the relatively short out-life and the need for accurate mixing are inefficient.

To enable use of advanced composite materials in such industrial structures and to be suitable for use in large volume industrial applications, a bonding adhesive is needed that retains the function of dealing with contaminated substrate surfaces and can cure in less than 5 minutes, ideally in less than 2 minutes. The adhesive must have a long out-life and be supplied in one-component form.

Previous attempts to reduce the time required for the curing reaction by appropriate selection of the epoxy resin or resins used, the amount and nature of the curative and the amount and nature of the catalyst have had limited success in reducing the time required for the curing reaction and have not resulted in an adhesive composition having the desired mechanical properties.

U.S. Pat. No. 4,803,232 describes fast curing by making a two component adhesive. This involves a lot of extra complexity and waste for material storage, mixing and application. The adhesive composition comprises an epoxy resin or polymethylacrylate cured with a combination of an amine-functional butadiene-acrylonitrile rubber, at least one aliphatic or aromatic polyamine and at least one polyamide.

WO 2010/039614 describes a fast curing adhesive but again this relies on a two component format to achieve the balance of storage stability and cure speed. This involves a lot of extra complexity and waste for material storage, mixing and application. The adhesive may be cured at room temperature for at least three hours. The Examples show cure at 180° C. for 30 minutes.

WO 2008/016889 describes a film product with curing at above 150° C. for 10 to 120 minutes. Rubber particles are stably dispersed in the epoxy resin matrix and so remain as separate individual particles.

US2008/0308212 describes an adhesive material including an epoxy resin, an impact modifier and a curing agent. Theoretical exemplary formulations include aliphatic epoxy resins and solid nitrile rubber or solid epoxy adduct in amounts of 15 and 45 weight percent of the adhesive material respectively.

SUMMARY OF THE INVENTION

According to the invention there is provided a composition, a method, a product, an article, a prepreg, and a use as defined in any one of the accompanying claims.

The present invention provides an adhesive composition comprising:
(a) at least one aromatic epoxy resin;
(b) an epoxy resin rubber adduct;
(c) an amine curing agent;
and one or more of:
(d) an oil absorbent
(e) a corrosion inhibitor
(f) a urone based accelerator In an embodiment, components (a), (b) and (c) form a catalysed one-component epoxy resin. The catalysed one-component epoxy resin comprises in addition one or more of components (d), (e) and (f). The concentrations of each of the components (a-f) is defined herein after.

The present invention further provides a method for curing the adhesive composition, comprising heating the composition up to 150° C. for no more than 150 seconds. Preferably, the cure can take place at a temperature of between 100° C. and 150° C. over a period of between 20 s to 150 s, more preferably between 30 s to 120 s, and even more preferably between 50 s and 110 s and/or combinations of the aforesaid cure times.

In an embodiment, the corrosion inhibitor and/or oil absorbent is present on the surface of the adhesive composition following cure of the composition.

In a further embodiment the adhesive composition is in the form of a film or semi-solid at 40° C. or below having a viscosity of at least 110,000 Pa·s at 40° C. and preferably in the range of from 120,000 to 200,000 Pa·s at 40° C., preferably from 130,000 to 350,000 Pa·s and/or combinations of the aforesaid ranges. The viscosity of the adhesive composition at 80° C. is in the range of from 100 to 1000

Pa·s, preferably from 150 to 900 Pa·s, more preferably from 250 to 800 Pa·s and/or combinations of the aforesaid values and ranges (viscosity is measured in accordance with ASTM D445 at the defined temperature).

We have found that the epoxy rubber adduct present in a concentration of from 20 to 35 weight % based on the weight of the composition results in the above defined viscosity properties, whilst also extending the out-life of the composition when stored at 23° C. to at least 4 or 6 months. The adhesive composition can therefore be supplied in a one-component catalysed form as it does not require mixing of one or more additional components into the adhesive composition shortly before its application and use.

In an embodiment there is provided an adhesive composition comprising a catalysed one-component epoxy resin. In the present invention the catalysed one-component epoxy resin comprises at least an aromatic epoxy resin, an epoxy resin rubber adduct and an amine curing agent.

The present invention also provides a cured product obtainable by the curing method.

The present invention further provides a method of making a composite article which comprises contacting a surface with the adhesive composition and curing the composition in contact with the surface to prepare a composite article.

The present invention also provides a composite article obtainable by the manufacture method.

The present invention also provides a method of simultaneous curing of a composite material and bonding of the composite material to a non-composite surface.

The present invention further provides a prepreg comprising fibrous reinforcement and the adhesive composition.

DETAILED DESCRIPTION

The present invention provides an adhesive composition comprising:
(a) at least one aromatic epoxy resin;
(b) an epoxy resin rubber adduct;
(c) an amine curing agent; and optionally one or more of:
(d) optionally an oil absorbent
(e) optionally a corrosion inhibitor
(f) a urone based accelerator The amounts of components may include, by total weight of the composition, any combination of the following:
(a) 40 to 60 wt % aromatic epoxy resin; and
(b) 20 to 35 wt % epoxy resin rubber adduct; and
(c) 3 to 7 wt % amine curing agent; and
(d) 8 to 12 wt % oil absorbent; and
(e) 0.1 to 2 wt % corrosion inhibitor; and
(f) 2 to 6 wt % urone based accelerator For example, the amounts can include by total weight of the composition:
(a) 40 to 60 wt % aromatic epoxy resin;
(b) 20 to 35 wt % epoxy resin rubber adduct;
(c) 3 to 7 wt % amine curing agent;
(d) 8 to 12 wt % oil absorbent;
(e) 0.1 to 2 wt % corrosion inhibitor;
(f) 2 to 6 wt % urone based accelerator Epoxy Resin The adhesive compositions of the present invention contain at least one aromatic epoxy resin. Aromatic epoxy resins as referred to herein are epoxy resins containing at least one aromatic unit in the backbone or in a side chain, if present. Typically, the aromatic epoxy resins include at least one aromatic epoxide, such as for example a glycidyl ether, preferably at a terminal position of the resin backbone or side chain if present. Aromatic epoxy resins that can be used include, for example, the reaction product of phenols (phenols and formaldehyde) and epichlorohydrin, peracid epoxies, glycidyl esters, glycidyl ethers, the reaction product of epichlorohydrin and amino phenols, the reaction product of epichlorohydrin and glyoxal tetraphenol, and the like. Phenols as referred to above include polynuclear phenols (i.e. compounds having at least two phenol functional groups). Typical examples of polynuclear phenols are bisphenols.

The epoxy resin can be in solid or semi-solid form or a blend thereof. Suitable epoxy resins may comprise blends of two or more epoxy resins selected from mono-functional, di-functional, tri-functional, and/or tetra-functional epoxy resins.

Suitable difunctional epoxy resins, by way of example, include those based on: bisphenol F, bisphenol A (optionally brominated), phenol, phenol and cresol epoxy novolacs, aromatic glycidyl amines, naphthalene, or any combination thereof.

Suitable tri-functional epoxy resins are available from Huntsman Advanced Materials (Monthey, Switzerland) under the tradenames MY0500 and MY0510 (triglycidyl para-aminophenol), and MY0600 and MY0610 (triglycidyl meta-aminophenol). Triglycidyl meta-aminophenol is also available from Sumitomo Chemical Co. (Osaka, Japan) under the trade name ELM-120.

Suitable tetra-functional epoxy resins include N,N, N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.), DEN439 (from Dow Chemicals), Araldite ECN 1273 (from Huntsman Advanced Materials), and Araldite ECN 1299 (from Huntsman Advanced Materials). Preferable epoxy resins include Araldite GT6071 from Huntsman, and LY1589, also from Huntsman.

The preferred epoxy resin is bisphenol A epoxy resin. Most preferred is a blend of solid bisphenol A epoxy resin and semi-solid or liquid bisphenol A epoxy resin. Where a blend of epoxy resins is used in the adhesive composition, the blend (excluding the epoxy rubber adduct) preferably has a combined EEW of from 150 to 1000, more preferably the EEW of the blend is from 200 to 600, and most preferably from 300 to 400. Where the blend comprises a solid epoxy bisphenol A resin, an EEW from 300 to 600 for the solid resin itself is preferred, and an EEW of from 400 to 500 is more preferable still. It is also preferred for the composition to comprise a phenol epoxy novolac, preferably in an amount of 5 to 15 wt % by total weight of the adhesive composition.

The total amount of aromatic epoxy resin by total weight of the adhesive composition can be in the range of 40 to 65 wt %, and preferably from 50 to 60%. Preferably the solid aromatic epoxy resin is present in an amount of from 5 to 30 wt % by total weight of the composition, and the semi-solid or liquid aromatic epoxy resin in an amount from 20 to 60 wt %. More preferably the solid aromatic epoxy resin is present in an amount of from 10 to 20 wt % by total weight of the composition, and the semi-solid or liquid aromatic epoxy resin in an amount from 25 to 45 wt %. The preferred combined EEW for all resin components including the Epoxy Resin Rubber adduct is from 300 to 1000, or more preferably from 400 to 600, or more preferably still from 450 to 550.

The reactivity of an epoxy resin is indicated by its epoxy equivalent weight (EEW); the lower the EEW the higher the reactivity. The epoxy equivalent weight can be calculated as follows: (Molecular weight epoxy resin)/(Number of epoxy groups per molecule). Another way is to calculate with epoxy number that can be defined as follows: Epoxy number=100/epoxy eq.weight. To calculate epoxy groups per molecule: (Epoxy number×mol.weight)/100. To calculate mol.weight: (100×epoxy groups per molecule)/epoxy number. To calculate mol.weight: epoxy eq.weight×epoxy groups per molecule.

Epoxy Resin Rubber Adduct

The adhesive composition of the present invention also contains an epoxy resin rubber adduct. The presence of the epoxy resin rubber adduct increases the lap shear strength of the composition when cured in comparison to a composition in which the epoxy resin rubber adduct is not present. Furthermore, the epoxy rubber adduct provides large non-polar domains associated with the rubber component, these are capable of adsorbing oily contaminants and removing them from the bonding surfaces. Thus the epoxy resin adduct also provides an oil absorbing function.

Furthermore, we have discovered that the addition of an epoxy resin rubber adduct of 10 to 50% by weight based on the weight of the adhesive composition, preferably from 15 to 45% by weight, and more preferably from 20 to 40% by weight, and even more preferably from 23 to 35% by weight or from 24 to 32% by weight and/or combinations of the aforesaid values and ranges (all based on the weight of the adhesive composition), results in an increased viscosity of the adhesive composition at a temperature of 40° C. or below such that the composition is in the form of a film or semi-solid at 40° C. or below having a viscosity of at least 110,000 Pa·s at 40° C. whilst the viscosity of the composition at 80° C. is in the range of from 100 to 1000 Pa·s, preferably from 150 to 900 Pa·s and more preferably from 200 to 800 Pa·s and/or combinations thereof and also, we have found that for these weight ranges, outlife of the adhesive composition is increased to at least 6 months at a storage temperature of 23° C.

An adduct is a product of a direct addition of two or more distinct molecules, resulting in a single reaction product. Therefore the epoxy resin rubber adduct according to the present invention is a distinct molecular species and does not take the form of a dispersion of rubber particles which remain individual within an epoxy resin matrix. An epoxy resin rubber adduct retains epoxy groups enabling it to form cross-links in cured thermosetting matrix, contributing to the intrinsic polymer network rather than existing as detached phase.

The rubber may be functionalized at either the main chain or the side chain. Suitable functional groups include, but are not limited to, —COOH, —NH$_2$, —NH—, —OH, —SH, —CONH$_2$, —CONH—, —NHCONH—, —NCO, —NCS, and oxirane or glycidyl group etc. The rubber optionally may be vulcanizeable or post-crosslinkable. Exemplary rubbers include, without limitation, natural rubber, styene-butadiene rubber, polyisoprene, polyisobutylene, polybutadiene, isoprenebutadiene copolymer, neoprene, nitrile rubber, butadiene-acrylomitrile copolymer, butyl rubber, polysulfide rubber, acrylic rubber, acrylonitrile rubbers, silicone rubber, polysiloxanes, polyester rubber, disocyanate linked condensation rubber, EPDM (ethylene-propylene diene rubbers), chlorosulfonated polyethylene, fluorinated hydrocarbons, thermoplastic rubbers such as (AB) and (ABA) type of block copolymers of styrene and butadiene or isoprene, and (AB)n type of multi-segment block copolymers of polyurethane or polyester, and the like.

In a preferred embodiment the molecular weight of the epoxy rubber adduct is in the range of from 10 to 100000 Daltons, preferably less than 100000 Daltons and more preferably in the range of from 20000 to 70000 or from 30000 to 60000 Daltons and/or combinations of the aforesaid ranges.

Examples of epoxide-functionalized epoxy/rubber which is sold in admixture with an epoxy resin is the product with the trade name HyPox™ RK84, a bisphenol A epoxy resin blended with CTBN rubber, and also the product with the trade name HyPox™ RA1340, an epoxy phenol novolac resin modified with CTBN rubber; both commercially available from CVC Thermoset Specialities, Moorestown, N.J. In addition to bisphenol A epoxy resins, other epoxy resins can be used to prepare the epoxy/rubber adduct, such as n-butyl glycidyl ether, styrene oxide and phenylglycidyl ether, bifunctional epoxy compounds such as bisphenol A diglycidyl ether, bisphenol F diglycidyl ether, bisphenol S diglycidyl ether and diglycideyl phthalate; trifunctional compounds such as triglycidyl isocyanurate, triglycidyl p-aminophenol; tetrafunctional compounds such as tetraglycidyl m-xylene diamine and tetraglycidyldiaminodiphenyl-methane; and compounds having more functional groups such as cresol novolac polyglycidyl ether, phenol novolac polyglycidyl ether, and so on.

Preferably the adduct comprises between 10 and 60% elastomer content, more preferably between 20 and 50%, and most preferably between 30 and 40%. Preferably the epoxy rubber adduct has an EEW of from 190 to 1500, more preferably from 250 to 800 and most preferably from 300 to 500.

Preferably the adduct comprises a nitrile rubber. The epoxy resin matrix may be based on any of the aforementioned epoxy resins. Suitable epoxy resins include bisphenol F and bisphenol A epoxy resins. Most preferred is when the composition comprises a nitrile rubber modified bisphenol F epoxy block copolymer. The epoxy resin rubber adduct is preferably present in an amount from 20 to 35 wt % by total weight of the composition, or more preferably from 25 to 30% by total weight of the composition.

Amine Curing Agent

The adhesive composition of the present invention also comprises at least one or more curing agents capable of cross-linking the curable epoxy resins. Typically these agents are primary or secondary amines. The amines may be aliphatic, cycloaliphatic, aromatic, or aromatic structures having one or more amino moieties.

Exemplary amine curing agents include ethylenediamine, diethylenediamine, diethylenetriamine, triethylenetetramine, propylene diamine, tetraethylenepentamine, hexaethyleneheptamine, hexamethylenediamine, cyanoguanidine, 2-methyl-1,5-pentamethylene-diamine, 4,7,10-trioxatridecan-1,13-diamine, aminoethylpiperazine, and the like. Exemplary curing agents include dicyanopolyamides, most preferably (DICY). 4,4'-diaminodiphenylsulfone (4,4'-DDS) or 3,3'-diaminodiphenyl (3,3'-DDS) can also be beneficially employed as a latent amine curing agent, as well as mixtures of DICY and DDS. Dyhadrazides such and ADH, IDH and Polyamines such as Ancamine 2441 and BF3-MEA complexes such as Anchor 1040 (Air Products) are also suitable as a latent curing agent.

In some embodiments, the amine curing agent is a polyether amine having one or more amine moieties, including those polyether amines that can be derived from polypropylene oxide or polyethylene oxide. Commercially available polyether amines include the polyether polyamines (available under the trade designation "JEFFAMINE" from Huntsman Corporation, The Woodlands, Tex., USA) and 4,7,10-trioxatridecane-1,13-diamine (TTD) (available from BASF, Ludwigshafen, Germany). Preferred amine curing agents include latent curing agents such as dicyandiamide. A latent hardener is preferred as an amine curing agent as it provides improved potlife. A preferred latent amine curing agent is Dyhard 100E from AlzChem.

The adhesive composition of the present invention may comprise from 2 to 15 wt % amine curing agent by total weight of the composition. Preferably, the adhesive composition comprises from 3 to 7 wt % amine curing agent.

In an embodiment of the present invention, the amine curing agent and if present, cure accelerator, are selected so that the adhesive compositions demonstrates an out-life greater than 30 days when stored at 23° C., particular an out-life in the range of from 1 to 8 months, particularly from 4 to 6 months or greater than 6 months when stored at 23° C. Out-life is defined as the period of time the composition remains in a handleable form and with properties intact outside of the specified storage environment; for example, out of the freezer in the case of the adhesive composition.

Additional Components

Optionally the adhesive composition may comprise property modifying additives such as fillers. These can be added to promote adhesion, improve corrosion resistance, improve thermal or electrical conductivity, control the rheological properties of the adhesive, and/or reduce shrinkage during curing. Fillers may include silica-gels, calcium-silicates, phosphates, molybdates, fumed silica, amorphous silica, amorphous fused silica, clays such as bentonite, organoclays, aluminium-trihydrates, hollow-glass-microspheres, hollow-polymeric microspheres, and calcium carbonate. Fillers can be advantageously added to the adhesive composition in the present invention to improve the flow characteristics and increase the bulk of the composition. Preferred fillers may be selected from $CaCO_3$, TiO (titanium oxide), silica, microballoons, talc, colloidal silica, kaolin, microfibers or Microlight™ as supplied by West Epoxy. The composition may also contain filler particles to allow glue line thickness control. These particles may be glass beads, silica oxide or micro-balloons. The size of the particles may range from 50 microns to 500 microns, preferably from 100 to 200 microns. In an embodiment of the present invention the adhesive composition may comprise a foaming agent.

A urone accelerator may also be present in the adhesive composition. The use of a urea based accelerator as the urone accelerator is preferred. Preferred urea based materials are the range of materials available under the commercial name DYHARD® the trademark of Alzchem, and urea derivatives such as the ones commercially available as UR200, UR300, UR400, UR600 and UR700. Most preferred as urone accelerators include 4,4-methylene diphenylene bis(N,N-dimethyl urea) CAS 10097-09-0 (available from Ermerald as Omnicure U52 M). The urone accelerator is preferably present in the composition in an amount of 2 to 20 wt %, more preferably from 3 to 12% by total weight and most preferred in an amount of 4 to 8 wt % by total weight of the composition. A latent accelerator such as an urone is preferred.

The composition may also comprise a toughener which may dissolve in the epoxy resin such as polyethersulfone (PES), or it may contain toughener in a particle form. The thermoplastic toughener material may be in the form of a particle. The thermoplastic particle may be present in the range of from 1 to 20 wt % in relation to the resin, preferably from 2 to 15 wt % in relation to the resin, and more preferably from 3 to 14 wt % in relation to the resin. In a yet further preferred embodiment the thermoplastic material is a polyamide. Suitable examples of thermoplastic particles include, by way of example, polyamides, polycarbonates, polyacetal, polyphenylene oxide, polyphenylene sulphide, polyarylates, polyethers, polyesters, polyimides, polyamidoimides, polyether imides, and polyurethanes. Polyamides are the preferred type of thermoplastic particles. The polyamide particles may be made from polyamide 6 (caprolactame-PA6), polyamide 12 (laurolactame-PA12), polyamide 11, polyurethane, polymethyl methacrylate, crosslinked polymethyl methacrylate, densified polyethylene sulfone, or any combination thereof. Preferred thermoplastic particles are polyamide particles that have a melting point of between about 140° C. and 240° C. The particles should have particle sizes of below 100 microns. It is preferred that the particles range in size from 5 to 60 microns and more preferably from 10 to 30 microns. It is preferred that the average particle size be around 20 microns. Suitable polyamide particles that may be used include Orgasol 1002 D NAT1 (PA6), Rilsan PA11 P C20HT (PA11) and Ultramid 4350 (PA6T). Rubbers may also be suitable for use as tougheners and/or to control tack, exemplary rubbers include coreshell rubbers as produced by Kaneka under the trade name Kane Ace.

The composition may also contain conductive particles so that the final component has an electrical pathway. Examples of conductive particles include those described in WO2011/027160, WO2011/114140 and WO2010/150022.

Other preferred additional components to the adhesive composition include ethylene vinyl acetate copolymers, preferably in an amount of 3 to 7% by weight of the total composition.

Oil Absorbent

The oil absorbent may comprise an epoxy component or resin having a linear aliphatic non-polar adduct. The oil absorbent may comprise the epoxy rubber adduct as hereinbefore described. We have discovered that these epoxy components or resins act as suitable oil absorbents in the compositions of the invention.

In addition to the epoxy rubber adduct the adhesive composition may also comprise one or more additional oil adsorbents. One such oil adsorbent is $CaCO_3$, which can be added to the adhesive composition as a filler. Due to its porous microstructure it may also provide additional oil absorbency. Other oil absorbents may also be added, these include silicas, fumed silicas, kaolin clays, absorbent polymers such as polypropylene, poly ethylene and polyvinyls. Oil displacement additives may also be added to the composition to displace oil from the bonded surface.

The oil absorbent may comprise an epoxy component or resin having a linear aliphatic non-polar adduct. We have discovered that these components or resins act as suitable oil absorbents in the compositions of the invention.

In a preferred embodiment the oil absorbent comprises an epoxy combined with a CTBN rubber, or a linear aliphatic non-polar component. The oil absorbent may also comprise a carboxyled acrylonitrile butadiene copolymer which may be combined with talc partitioning agent.

Corrosion Inhibitor

The adhesive composition may also comprise one or more corrosion inhibitors in addition to the epoxy components, which when cured function as a corrosion inhibitor. Additional corrosion inhibitors may provide additional benefit for inhibiting corrosion occurring at the bond line. Typically, the inhibitor is substantially free of Cr to conform to potential future environmental restrictions. Any appropriate inorganic salt may be used as a corrosion inhibitor. The inhibitor may comprise phosphates, phosphosilicates, titanates, zinc salts, silicates, and mixtures thereof. A preferred corrosion inhibitor is strontium aluminum polyphosphate hydrate. The corrosion inhibitor may also comprise a synergist. The corrosion inhibitor is preferably present in the composition in an amount of 0.1 to 12 wt % by total weight of the composition, preferably from 0.5 to 2% by weight based on the total weight of the composition.

Carrier

The adhesive composition may be cast into a thin film on a carrier material. The carrier material may be a paper or polymer backing sheet which is removed after the adhesive composition is applied to a surface to be bonded. Alternatively the carrier may remain in place, in between two bonded surfaces. This has the effect of insulating two surfaces of different electrode potential thus inhibiting galvanic corrosion. Suitable carriers for inhibiting galvanic corrosion include sheets, fabrics and veils comprising any of glass fibre, thermoplastics and natural materials.

Curing

The composition of the present invention is curable at 150° C. in no more than 150 seconds, preferably in no more than 120 seconds. "Curable" in this context means that the composition of the present invention is cured to a level of cure of at least 95% in comparison to a fully cured composition. The level of cure can be determined as follows.

In general terms 95% cure defines an epoxy resin containing composition in which a sufficient majority of the reactive sites have been consumed so that the mechanical performance and thermal resistance of the cured composition is within the desired characteristic range for that composition to provide the desired mechanical and chemical performance properties. It is possible to expend additional time and energy to obtain the final 5% of cure but this will not result in a significant mechanical or thermal improvement. Digital Scanning Calorimetry is utilized to monitor the time to reach 95% cure. The total heat or reaction enthalpy detected during the DSC measurement is identified as the heat released by the curing reaction when the resin is heated from a starting temperature of typically 10° C. (or room temperature of 21° C.) to a temperature at which cure is anticipated to be completed. For fast cure epoxy resins the temperature at which cure is anticipated to be fully completed is typically 100 to 225° C., preferably from 100 to 160° C. and the ramp rate for the temperature is typically set at 10° C./s or faster rate.

Once the total heat enthalpy has been established, the residual cure of any subsequent test sample of the resin which has been subjected to a particular cure can then be analysed by exposing the test sample to the same heat up rate and the remaining reaction enthalpy is determined using DSC. The degree of cure of the test sample is then given by the following formula: cure %=($\Delta$ Hi-$\Delta$ He)/$\Delta$ Hi×100 where $\Delta$Hi is the heat generated by the uncured resin heated from the starting temperature up to the anticipated fully cured temperature (in the present invention typically 150° C.) and $\Delta$He the heat generated by the test sample heated up after initial cure to it being fully cured at 150° C. (so $\Delta$He represents the residual enthalpy which is released following complete curing of the sample following on from the initial cure schedule).

In relation to cure, phase angle is also an important parameter. The phase angle is used to describe the physical state of the resin. The phase angle is low when the resin will not flow or has limited flow and is a solid or semi sold; and the phase angle increases as the ability to flow increases, for example when the temperature of the catalysed adhesive composition is increased during processing. However in epoxy resin systems that contain a curative which is normally heat activated, the cross linking action of the epoxy resin due to the action of the curative will cause the resin to harden and the phase angle to drop at elevated temperature. The phase angle can therefore be used to determine the form of the resin and the temperature at which an adhesive composition will be sufficiently cured (or solid) to be readily handled and to have the desired mechanical properties.

The present invention seeks to reduce the temperature at which the desirable lower phase angle is obtained and/or to reduce the processing time required for the adhesive composition to reach the desirable low phase angle. When a phase angle is below 20°, preferably below 15°, more preferably below 10° is reached after heating the composition to a temperature up to 120° C. or 150° C. for no more than 150 s or 120 s, the processed adhesive composition can be handled.

The need for higher Tg and low phase angle must therefore be balanced with requirements for handleability of the adhesive composition and with the economic needs to minimise the time required for processing the adhesive composition.

During curing of the composition of the invention, the corrosion inhibitor and/or oil absorbent may phase separate out from the composition so that upon cure, the corrosion inhibitor and/or oil absorbent are present on the surface of the cured adhesive composition.

Furthermore, the composition is curable to bond two surfaces to obtain a product with lap shear strength of greater than 6 MPa, and for some embodiments, even greater than 20 MPa (measured in accordance with ISO 527 at 23° C.). These lap shear strengths can be achieved with cure a cure temperature of 150° C. and a cure time of no more than 210, or 200, or 180 or 120 or 150 seconds respectively when applied to oily surfaces. The cure time is at least 30 s or 60 s or 90 s or 120 seconds.

The cure times for the reinforcement resin matrix (rrm) and the adhesive composition are defined as the time required for 95% cure. The Tg of the resin is measured according to Dynamic Mechanical Analysis according to Test Method ASTM D7028 and the Tg is considered to be the temperature at which there is an onset of the drop in storage modulus. Digital Scanning Calorimetry was utilized to monitor the time to reach 95% cure, whereby samples are held at isothermal temperatures, the integral of the resulting thermogram is calculated to give the total heat of reaction. The time to reach 95% of the total heat of reaction can then be calculated from this.

Accordingly, the method of the present invention for curing the adhesive composition comprises heating the composition up to 150° C. for no more than 210 seconds or 200 seconds or 180 seconds, or 150 seconds, preferably no more than 120 seconds and more preferably no more than 100 seconds. The product obtained from the curing reaction can bond two surfaces having desired lap shear strength results as confirmed by the Examples. The adhesive composition is preferably heated up to 150° C. and held at 150° C. for at least 30 seconds, more for at least 50 seconds, even more preferably for at least 90 seconds, and even more preferably for at least 100 seconds, or 120 seconds, or 150 seconds or 180 seconds but less than 5 mins, preferably 4 mins or 3.5 mins.

A composite article, also achieving such high lap shear strength results can be prepared by contacting a surface with the adhesive composition of the present invention and then curing the composition. The surface can be anything from metal, preferably steel, composites, porous, non-porous, thermoplastic, thermoset, sheet or honeycomb. The substrates to be bonded may also be different such as metal, composite, porous, non-porous, thermoplastic, thermoset, sheet or honeycomb.

The surface may also be contaminated with oil.

The adhesive composition of the present invention is suited to bonding a composite material to a metallic surface, and is particularly suited to bonding to an oily steel surface.

The adhesive composition of the present invention is advantageously compatible with thermoset matrices typically used in composite materials. In particular it is suited for use with fast cure epoxy matrices. A fast cure matrix is one which can cure in under 180, 150, or 120 seconds. The adhesive of the present invention can be co-cured with such fast cure epoxy resins, and is particularly suited for use with epoxy matrices having cure time less than 210 seconds or 180 seconds, or more preferably 150 seconds, or more preferably still 120 seconds. Thus the present invention can be used to simultaneously co-bond a composite material comprising a fast cure matrix. Thus the adhesive composition and the fast cure resin can be completely cured in the same cure step.

The adhesive composition of the present invention is capable of electrically insulating the surfaces of two bonding surfaces. This is particularly relevant when, for example, it is used to bond a carbon composite to a metallic surface. The adhesive composition of the present invention provides an insulating layer which prevents galvanic corrosion from occurring between the two materials. The adhesive composition achieves this without the need for a foaming agent which would otherwise reduce the mechanical properties of the cured composition. Thus, in an embodiment of the present invention the adhesive composition does not comprise a foaming agent.

The adhesive composition may be provided on a carrier such as a veil, fleece, chopped glass fibres, fabric or a substrate such as a paper or a polymer film (e.g. a polyolefin or polyethylene film). The carrier or fleece or veil may comprise a continuous fibre, chopped mat, natural fibre, inorganic fibre, synthetic fibre, knitted, woven, co-mingled or needle punched fibre. In a preferred embodiment the carrier comprises glass fibres woven into a fabric or in a random fibre mat comprising individual filaments of 10-15 µm diameter and 10-20 cm length.

Alternatively the carrier may comprise a thermoplastic resin in solid form. The thermoplastic resin may comprise a polyamide. The thermoplastic may be in the form of a veil. The veil may be spun or calendared out of a solid resin material.

The adhesive may be used to provide primary bonding or to stabilise or reinforce a metal assembly which assembly is then further bonded ("secondary bonded") by mechanical means such as welding or riveting in a conventional way.

Prepreg

The present invention also provides a prepreg comprising fibrous reinforcement and the adhesive composition. The adhesive composition of the present invention may also be provided as a surface layer applied to a prepreg comprising a resin matrix of a composition which is different from the present invention. Such a resin composition is hereinafter referred to as the reinforcement resin matrix (rrm).

Prepreg is the term used to describe fibres impregnated with a resin in the uncured or partially cured state and ready for curing. The structural fibres employed in the prepregs of this invention may be of any suitable material, glass fibre, carbon fibre, natural fibres (such as basalt, hemp, seagrass, hay, flax, straw, coconut) and Aramid™ being particularly preferred. They may be tows or fabrics and may be in the form of random, knitted, non-woven, multi-axial or any other suitable pattern.

For structural applications, it is generally preferred that the fibres be unidirectional in orientation. When unidirectional fibre layers are used, the orientation of the fibre can vary throughout the prepreg stack. However, this is only one of many possible orientations for stacks of unidirectional fibre layers. For example, unidirectional fibres in neighbouring layers may be arranged orthogonal to each other in a so-called 0°-90° arrangement, which signifies the angles between neighbouring fibre layers. Other arrangements, such as 0°-+45°-45°-90° are of course possible, among many other arrangements.

The structural fibres may comprise cracked (i.e. stretch-broken), selectively discontinuous, or continuous fibres. The structural fibres may be made from a wide variety of materials, such as carbon, graphite, glass, metalized polymers, aramid and mixtures thereof. The structural fibres may be individual tows made up of a multiplicity of individual fibres and they may be woven or non-woven fabrics. The fibres may be unidirectional, bidirectional or multidirectional according to the properties required in the final laminate. Typically the fibres will have a circular or almost circular cross-section with a diameter, preferably in the range from 5 to 19 µm. Different fibres may be used in different prepregs used to produce a cured laminate. Exemplary layers of unidirectional structural fibres are made from HexTow® carbon fibres, which are available from Hexcel Corporation. Suitable HexTow® carbon fibres for use in making unidirectional fibre layers include: IMY carbon fibres, which are available as fibres that contain 6,000 or 12,000 filaments and weight 0.223 g/m and 0.446 g/m respectively; IM8-IM1O carbon fibres, which are available as fibres that contain 12,000 filaments and weigh from 0.446 g/m to 0.324 g/m; and A57 carbon fibres, which are available in fibres that contain 12,000 filaments and weigh 0.800 g/m.

The structural fibres of the prepregs will be substantially impregnated with the epoxy resin and prepregs with a resin content of from 20 to 85 wt % of the total prepreg weight are preferred more preferably with 30 to 50 wt % resin.

The prepreg may bond directly to a substrate without need for an extra adhesive layer.

The prepregs of this invention can be produced by impregnating the fibrous material with the composition of the present invention. In order to increase the rate of impregnation, the process is preferably carried out at an elevated temperature so that the viscosity of the resin is reduced. However it must not be so hot for sufficient length of time that premature curing of the resin occurs. Thus, the impregnation process is preferably carried out at temperatures in the range of from 40° C. to 80° C. Typically the resin will be applied to the fibrous material at a temperature in this range and consolidated into the fibrous material by pressure such as that exerted by passage through one or more pairs of nip rollers.

For the prepreg containing the rrm, the prepreg is also produced by following the same impregnation process. Following impregnation with the rrm, the adhesive composition is applied on one or both surfaces of the prepreg by impregnation rollers or by contacting the surface with a film containing the adhesive composition.

The adhesive composition of the present invention may be prepared by feeding the components to a continuous mixer where a homogenous mixture is formed. The mixing is typically performed at a temperature in the range of from 35 to 80° C. The mixture may then be cooled and pelletized or flaked for storage. Alternatively the mixture may be fed directly from the continuous mixer onto a prepreg line where it is deposited onto a moving fibrous layer and consolidated into the fibrous layer, usually by passage through nip rollers. The prepreg may then be rolled and stored, or transported to the location at which it is to be used. An additional benefit of the prepregs based on the adhesive composition of the present invention is that as the composition is not tacky to the touch at ambient temperature a backing sheet for the prepreg may not be required.

Prepreg of the present invention may also be in the form of short segments of chopped unidirectional tape that are randomly oriented to form a non-woven mat of chopped unidirectional tape. This type of prepreg is referred to as a "quasi-isotropic chopped" prepreg. Quasi-isotropic chopped prepreg is similar to the more traditional non-woven fiber prepreg, except that short lengths of chopped unidirectional tape (chips) are randomly oriented in the mat rather than chopped fibers. Quasi-isotropic chopped prepreg is considered to be "transversely isotropic". The random orientation of the unidirectional chips provides isotropic properties in the plane of the mat. The quasi-isotropic chopped prepreg is therefore a transverse isotropic material. Properties are the same in any direction within the plane of the mat. Outside the plane of the mat (z direction), the properties are, however, different.

The quasi-isotropic chopped prepreg can be made by purchasing or making unidirectional prepreg tape of desired width. The tape is then chopped into chips of desired length and the chips are laid flat and pressed together to form a mat of randomly oriented chips. The chips inherently bond together due to the presence of the prepreg resin. The preferred method, however, is to purchase the quasi-isotropic chopped prepreg from a commercial source, such as Hexcel Corporation. Hexcel Corporation provides quasi-isotropic chopped prepreg material under the tradename HexMC®. Quasi-isotropic prepreg may be made from a prepreg comprising the resin formulation of the present invention. The size of the chips may be varied depending upon the particular aerospace part being made. It is preferred that the chips be ⅓ inch (0.85 cm) wide, 2 inches (5 cm) long and 0.006 inch (0.0015 cm) thick. The chips include unidirectional fibers that can be carbon, glass, aramid, polyethylene or any of the fibers types that are commonly used in the aerospace industry. Carbon fibers are preferred. The chips are randomly oriented in the mat and they lay relatively flat. This provides the mat with its transverse isotropic properties.

Specific aspects of the rrm will now be discussed. The rrm may comprise an epoxy resin formulation containing a curative that can be cured at 150° C. to 95% cure in no more than 150 seconds, and can be cured at 120° C. to 95% cure in no more than 4 minutes to provide a cured resin having a Tg no greater than 140° C. (ASTM D7028-07). The cured adhesive epoxy resin formulation or adhesive composition preferably has a Phase angle (derived from tan delta measurement, ASTM D4065) below 20° at a temperature below 140° C., preferably below 15°, more preferably below 10°. The phase angle may be above 10° or 20° or 30° or 40° at a temperature below 140° C.

The rrm may comprise an epoxy resin formulation containing a curative, the formulation comprising a phase angle below 30° when cured at 120° C. for less than 600 s, preferably less than 550 s. The rrm may comprise an epoxy resin formulation containing a curative, the formulation comprising a phase angle below 30° when cured at 130° C. for less than 350 s, preferably less than 300 s.

The rrm may also comprise one or more urea based curing agents and it is preferred to use from 4 to 10 wt % based on the weight of the epoxy resin of a curing agent, more preferably 4 to 6 wt %, more preferably from 4 to 5 wt %. Preferred urea based materials are the isomers of 2,6 and 2,4 toluene bis dimethyl urea (known as 2,6 and 2,4 TDI urone) such as the range of materials available under the commercial name DYHARD® the trademark of Alzchem, urea derivatives. The rrm further comprises a hardener such as dicyandiamide and it is preferred to use from 7% to 10%, more preferably from 8 to 10, most preferably from 8.5 to 9.5% by weight of the hardener. The rapid cure time is achieved by matching the ratio of the curative and the accelerator to the amount of available reactive groups in the epoxy formulation. The higher Tg is obtained by use of a resin having a functionality of at least 2 to provide sufficient reactive groups.

The rrm preferably has a storage modulus G' of from $3 \times 10^5$ Pa to $1 \times 10^8$ Pa and a loss modulus G" of from $2 \times 10^6$ Pa to $1 \times 10^8$ Pa at room temperature (20° C.) (loss modulus and storage modulus are determined in accordance with ASTM D4065). Preferably, the rrm has a storage modulus G' of from $1 \times 10^6$ Pa to $1 \times 10^7$ Pa, more preferably from $2 \times 10^6$ Pa to $4 \times 10^6$ Pa at room temperature (20° C.).

Preferably, the rrm has a loss modulus G" of from $5 \times 10^6$ Pa to $1 \times 10^7$ Pa, more preferably from $7 \times 10^6$ Pa to $9 \times 10^6$ Pa at room temperature (20° C.). Preferably, the resin material has a complex viscosity of from $5 \times 10^5$ Pa to $1 \times 10^7$ Pa·s, more preferably from $7.5 \times 10^5$ Pa to $5 \times 10^6$ Pa·s at room temperature (20° C.).

Preferably, the rrm has a complex viscosity of from $1 \times 10^6$ Pa to $2 \times 10^6$ Pa·s. more preferably from 5 to 30 Pa·s at 80° C. Preferably, the resin material has a viscosity of from 10 to 25 Pa·s at 80° C. This complex viscosity is obtained using a rheometer to apply an oscillation experiment (in accordance with ASTM standard D2393). From this the complex modulus G* is derived as the complex oscillation which is applied to the material is known (Principles of Polymerization, John Wiley & Sons, New York, 1981). In viscoelastic materials the stress and strain will be out of phase by an angle delta (known as the phase angle). The individual contributions making the complex viscosity are defined as G' (Storage Modulus)=G*×cos(delta); G" (Loss Modulus)= G*×sin(delta). This relationship is shown in FIG. 8 of WO 2009/118536. G* is the complex modulus. G' relates to how elastic the material is and defines its stiffness. G" relates to how viscous a material is and defines the damping, and liquid non-recoverable flow response of the material. The loss modulus G" indicates the irreversible flow behaviour and a material with a high loss modulus G" is also desirable to prevent the early creep-like flow and maintain an open air path for longer. In this specification, the viscoelastic properties, i.e. the storage modulus, loss modulus and complex viscosity were measured at application temperature (i.e. a lay-up temperature of 20° C.) by using a Bohlin VOR Oscillating Rheometer with disposable 25 mm diameter aluminium plates. The measurements were carried out with the following settings: an oscillation test at increasing temperature from 50° C. to 150° C. at 2° C./mm with a controlled frequency of 1.59 Hz and a gap of 500 micrometer.

The present invention will now be illustrated, but in no way limited, by reference to the following examples and drawings.

Figure 2:
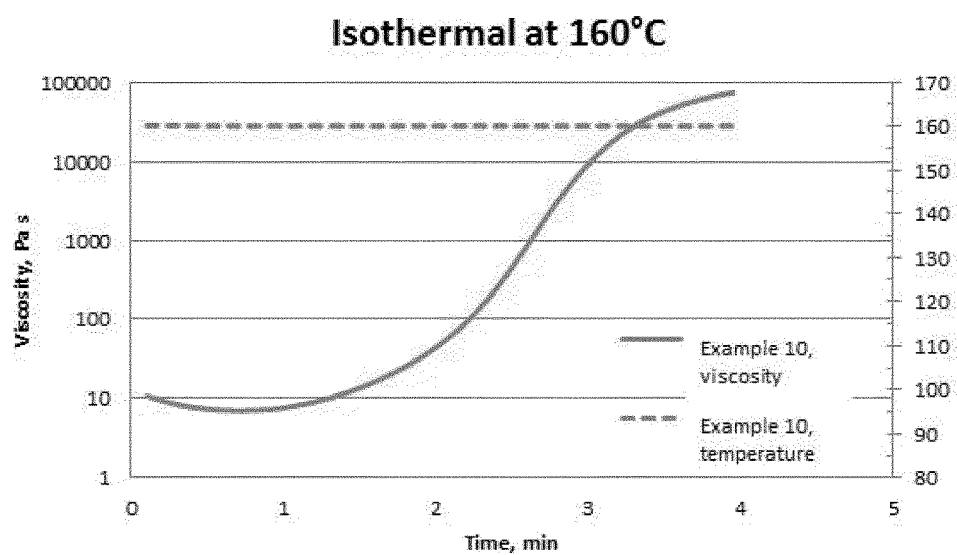

In the drawings, FIG. 1 presents the viscosity in relation to the temperature for the compositions of Examples 5 and 10 according to embodiments of the invention, and;

FIG. 2 presents the viscosity for the formulation of Example 10 during isothermal cure at 160° C.

EXAMPLES

In this section, the viscoelastic properties, i.e. the storage modulus, loss modulus and (complex) viscosity were measured at 20° C. unless otherwise stated by using a Bohlin VOR Oscillating Rheometer with disposable 25 mm diameter aluminium plates. The measurements were carried out with the following settings: an oscillation test at increasing temperature from 50° C. to 150° C. at 2° C./mm with a controlled frequency of 1.59 Hz and a gap of 500 micrometer. Tan delta is defined as the ratio of the loss modulus to storage modulus. Loss modulus, storage modulus and tan delta are determined in accordance with ASTM D 4065.

Examples 1 to 5

Lap shear testing was performed on Hot Dip galvanized steel that was cleaned with a volatile solvent (acetone) to give a grease and dirt free surface. The clean surface was then dosed with anticorrosion oil, Anticorit PL3802-39S (Fuchs), to give a coating of 3 g/m². This was used as the substrate for lap shear testing. Adhesive compositions were applied to the oiled surface and a second, oiled, piece of steel was applied to form the other side of the lap shear joint.

Prepared samples were held together with retaining bulldog style clips (51 mm long, Office Depot brand) on both sides of the adhesive joint and then placed into a pre-heated oven that had been equilibrated at 150° C. to allow the adhesive to cure for 3 minutes.

The samples were then removed from the oven and allowed to cool to room temperature. Once cool the retaining clips were removed, a lap shear test was performed in accordance with ISO 527.

The adhesive composition in accordance with the present invention (Example 4) is shown in Table 1 below.

This was compared to industry standard one component paste adhesives for oiled steel. Comparative Example 1 was Araldite AV 4600 (Huntsman Corporation). Comparative Example 2 was Betamate 1460 (Dow Chemical Company). Comparative Example 3 was AF 126-2 (3M).

The results are shown in Tables 2 and 3 below.

TABLE 1

| Example 4 formulation | | |
|---|---|---|
| Chemical | wt % by total weight | |
| Araldite GT6071 | 14 | Solid Bis-A epoxy from Huntsman, EEW 450-465 |
| PD3611 | 27 | Rubber adducted bis-F epoxy from Schill & Seilacher |
| LY1589 | 39 | Semi Solid Bis-A epoxy from Huntsman, EEW 300-340 |
| CaCO3 | 10 | Mineral filler |
| SAPP—Strontium aluminium polyphosphate hydrate | 1 | Non chromium corrosion inhibitor |
| Dyhard 100E | 5 | Amine curing agent from AlzChem |
| Omicure U52 M | 4 | MDi urone accelerator from CVC |
| | 100.00 | |

TABLE 2

| Lap shear test results (tested at 23° C.) | | | |
|---|---|---|---|
| Curing conditions | Comparative Example 1 | Comparative Example 2 | Comparative Example 3 |
| Press @ 150° C. for 3 mins | No test possible, sample fell apart under its own weight | No test possible, sample fell apart under its own weight | No test possible, sample fell apart under its own weight |

TABLE 3

| Lap shear test results (ISO 527, tested at 23° C.) | |
|---|---|
| Curing conditions | Example 4 (MPa) |
| Oven @ 150° C. for 15 mins | 23.7 |
| Press @ 150° C. for 4 mins | 21.9 |
| Press @ 150° C. for 3 mins | 20.7 |
| Press @ 150° C. for 2 mins | 6.8 |

Examples 6 and 7

TABLE 4

Examples 4 and 5

| Chemical | Example 4 % by total weight | Example 5 % by total weight |
| --- | --- | --- |
| Araldite GT6071 | 14 | 15 |
| PD3611 | 27 | 30 |
| Advanced Bis A EEW 330 | 39 | 27 |
| YD PN 638 |  | 10 |
| CaCO3 | 10 | 8 |
| SAPP | 1 | 1 |
| Dyhard 100E | 5 | 5 |
| U52 M | 4 | 4 |

Example 5 was based on Example 4 except that an advanced semi-solid bisphenol A epoxy resin having an EEW of 330 was used and a further resin component was included (YD PN638, a phenol novolac epoxy).

Example 6 was designed to investigate the effect of the addition of a polyamide thermoplastic (ELVAX 40W). The same lap shear test was carried out in the same way as for Examples 1 to 5.

TABLE 5

Examples 5 and 6

| wt % by total weight of composition | Example 5 | Example 6 |
| --- | --- | --- |
| Araldite GT6071 | 15 | 15 |
| PD3611 | 30 | 30 |
| Advanced Bis A EEW 330 | 27 | 27 |
| YD PN 638 | 10 | 10 |
| Elvax 40W |  | 5 |
| CaCO3 | 8 | 8 |
| SAPP | 1 | 1 |
| Dyhard 100E | 5 | 5 |
| U52 M | 4 | 4 |
| Results |  |  |
| Lap shear strength, MPa (ISO 527) | 21.0 | 21.1 |
| Cured Tg, ° C. (D7028-07) | 109.0 | 109.8 |
| Tan Delta, ° C. (D4065) | 129.6 | 126.6 |

Examples 5 and 6 were press cured at 150° C. for 3 minutes. Although the results of Example 6 are equivalent to Example 5, it was observed that in a neat resin cure Example 6 had very low porosity in comparison to the very high porosity of the cured composition of Example 5.

Examples 7 to 9

Compositions, by wt % of the total composition, for Examples 7, 8 and 9 are shown in Table 6.

TABLE 6

Examples 7 to 9 compositions

| wt % by total weight of composition | Example 7 | Example 8 | Comparative Example 9 |
| --- | --- | --- | --- |
| Araldite GT6071, % | 14 | 14 | 14 |
| PD3611, % | 27 |  |  |
| PD3614, % |  | 27 |  |
| Advanced Bis A resin EEW 330, % | 39 | 39 | 66 |
| CaCO3, % | 10 | 10 | 10 |
| SAPP—Strontium aluminium polyphosphate hydrate, % | 1 | 1 | 1 |
| Dyhard 100E, % | 5 | 5 | 5 |
| U52 M, % | — | 4 | 4 |
| UR200, % | 4 |  |  |

Example 7 corresponds to Example 4 except for replacement of 4,4-methylene diphenylene bis(N,N-dimethyl urea) (U52 M) urone accelerator with another urone accelerator (UR200).

Example 8 corresponds to Example 4 except for the replacement of bisphenol F epoxy resin rubber adduct (PD3611) with bisphenol A epoxy resin rubber adduct (PD3614). The results show that bisphenol F epoxy resin rubber adduct (PD3611) achieves bonding to oily steel and forming a well cured joint in very short cure times.

Comparative Example 9 corresponds to Example 4 except for replacement of bisphenol F epoxy resin rubber adduct (PD3611) with an advanced bisphenol a of EEW 330). The results show that the epoxy resin rubber adduct is required for bonding to oiled steel.

The same lap shear tests were carried out as for Examples 1 to 6. All the Examples were cured for 2 and 3 min at 150° C. Results are shown in Table 7 below.

TABLE 7

Examples 7 to 9 results

|  | Example 7 | Example 8 | Comparative Example 9 |
| --- | --- | --- | --- |
| Lap shear strength (Mpa) (ISO 527) 2 min cure | Not tested (see 3 min result) | Test not possible at samples yielded/ elastic response from under cured adhesive | Not tested (see 3 min result) |
| Lap shear strength (Mpa) (ISO 527) 3 min cure | 1.5 | Test not possible at samples yielded/ elastic response from under cured adhesive | Sample failed before testing, adhesive failure to the steel substrate showing no bonding to the oiled steel surface |
| Cured Tg, ° C. (2 min cure, ASTM D7028-07) | 62.9 | 70.2 | 98.3 |
| Tan Delta, ° C. (2 min cure, ASTM D4065) | 86.0 | 105.4 | 122.2 |

TABLE 7-continued

Examples 7 to 9 results

|  | Example 7 | Example 8 | Comparative Example 9 |
|---|---|---|---|
| Cured Tg, ° C. (3 min cure, ASTM D7028-07) | 86.0 | 80.9 | 103.6 |
| Tan Delta, ° C. (3 min cure, ASTM D4065) | 108.3 | 120.6 | 126.1 |

We will now describe a further exemplary formulation (Example 10) with reference to the below Table 8.

TABLE 8

Examples 5 and 10

| Wt % by total weight of composition | Example 5 | Example 10 |
|---|---|---|
| Araldite GT6071 | 15 | — |
| Epikote 1009 | — | 15 |
| PD3611 | 30 | 30 |
| Advanced Bis A EEW 330 | 27 | 27 |
| YD PN 638 | 10 | 10 |
| CaCO$_3$ | 8 | 8 |
| SAPP | 1 | 1 |
| Dyhard 100E | 5 | 5 |
| U52 M | 4 | 4 |

The viscosity in relation to the temperature of the compositions of Examples 5 and 10 is presented in FIG. 1.

FIG. 2 presents the viscosity of the composition of Example 10 when cured at a fixed temperature of 160° C.

A laminate was prepared using a carbon woven fabric (HexForce® G0939 DA 1260 TCT HS03K as supplied by Hexcel Corporation) which was impregnated with the adhesive composition of Example 10 to result in an impregnated fabric having an overall weight of 340 gsm (g/m$^2$). This material is referenced as Example 11. The prepared laminate was cured in a Stahl Clam press at a temperature of 150° C. for varying periods ranging from 2 to 5 minutes and the cured T$_g$ (ASTM standard D 7028-07) and storage modulus onset (ASTM standard D 4065) were measured. The results are presented in the below Table 9.

TABLE 9

| Cure time (mins) | T$_g$ (° C.) | Storage modulus, onset (° C.) |
|---|---|---|
| 2 | 120 | 78 |
| 3 | 125 | 83 |
| 4 | 123 | 85 |
| 5 | 123 | 86 |

An additional laminate (Example 11) was prepared from the same fabric G0939 impregnated with the adhesive composition of Example 10. This material was heated to 100° C. and then the temperature was increased from 100° C. to 150° C. at a rate of 3° C. per minute, and the temperature was held at 150° C. for 30 minutes (dwell). After this, the laminate was allowed to cool to room temperature. The laminate was cut into samples. One sample was tested for cured T$_g$ and another sample was left in ionised water at 70° C. for 2 weeks and following on from this, the cured T$_g$ was measured. The results are presented in the below Table 10.

TABLE 10

| Cured Tg, ° C. (ASTM D 7028-07) | 103.71 |
|---|---|
| Cured Tg after 2 weeks @70° C. in water, ° C. (ASTM D 7028-07) | 70.15 |

Adhesive compositions of Example 10 in the form of films of 400 and 300 gsm (g/m$^2$) were pressed with 50 gsm (g/m$^2$) glass fleece (E glass random fibres) to form samples for Examples 12 and 13 respectively as outlined in below Table 11. As shown in Table 11 some 400 gsm specimens were conditioned in a humidity cabinet for up to 26 weeks at 24° C. 60% RH (relative humidity) or for up to 28 days at 40° C. 50% RH. Samples were prepared using the procedure described in Examples 1-5 to conduct measurements of SLSS (single layer shear strength), Bell peel strength and Flat wise tensile strength. SLSS was tested in accordance with ASTM standard D5868. The Bell peel strength test was determined in accordance with EN-2243-2. The flat wise tensile test was determined in accordance with ASTM C 297.

The samples for which the SLSS was measured were cured at 150° C. for 3 min. The samples for which Bell peel and Flat wise tensile strength were measured were cured at an initial temperature of 100° C. which was ramped up at a rate of 3° C. per minute from 100° C. to 150° C., and held at a dwell temperature of 150° C. for 30 minutes and these samples were then allowed to cool to room temperature. Below Table 11 presents the results.

TABLE 11

|  |  | Example 12 400 gsm | Example 13 300 gsm |
|---|---|---|---|
| SLSS on clean steel, MPa | RT | 28.8 |  |
| SLSS on oiled steel, MPa | RT | 23.7 | 22.9 |
|  | +65° C. | 16 |  |
|  | −30° C. | 34.2 |  |
| SLSS, MPa 28 days at 24° C. 60% RH (relative humidity) | RT | | 23.5 |
|  | +65° C. |  | 12.5 |
|  | −30° C. |  | 30.8 |
| SLSS, MPa 26 weeks @24° C. 60% RH | RT | 23.0 |  |
| SLSS, MPa 28 days @ 40° C. 50% RH | RT | 11.3 |  |
| SLSS, MPa 21 days @ 40° C. 50% RH | RT | 28.3 |  |
| SLSS, MPa, 7 days @ 40° C. 50% RH | RT | 25.3 |  |
| Bell peel, N/25 mm | RT | 274 | 217 |
| Flat wise tensile (MPa) | RT | 6.96 | 4.82 |

The invention claimed is:

1. An adhesive composition comprising:
    (a) 40 to 60 wt % aromatic epoxy resin, based on the total weight of said adhesive composition, said aromatic epoxy resin comprising a solid Bis-A epoxy resin having an epoxy equivalent weight of 450 to 465 and a semi-solid Bis-A epoxy resin having an epoxy equivalent weight of 300 to 340;
(b) 20 to 35 wt % rubber adducted Bis-F epoxy resin, based on the total weight of said adhesive composition;
(c) 3 to 7 wt % amine curing agent, based on the total weight of said adhesive composition;
(d) 8 to 12 wt % oil absorbent, based on the total weight of said adhesive composition;
(e) 0.1 to 2 wt % corrosion inhibitor, based on the total weight of said adhesive composition; and
(f) 2 to 6 wt % urone based accelerator, based on the total weight of said adhesive composition, said urone based accelerator comprising 4,4-methylene diphenylene bis (N,N-dimethyl urea wherein said adhesive composition may be stored at 23° C. for at least 4 months prior to use.

2. The composition according to claim 1 wherein said aromatic epoxy resin further comprises a phenol novolac epoxy resin.

3. The composition according to claim 1, wherein said amine curing agent comprises dicyandiamide.

4. The composition according to claim 1, wherein said rubber adducted Bis-F epoxy resin comprises a nitrile rubber.

5. The composition according to claim 1, wherein said oil absorbent comprises $CaCO_3$.

6. The composition according to claim 1, wherein said corrosion inhibitor is substantially free of chromium.

7. The composition according to claim 1, wherein the composition further comprises an ethylene vinyl acetate copolymer.

8. The composition according to claim 1, wherein the composition has a viscosity of at least 110,000 Pa·s at 40° C.

9. The composition according to claim 8, wherein the viscosity of the composition at 80° C. is in the range of from 100 to 1000 Pa·s.

10. A method for curing the composition according to claim 1, said method comprising heating the composition up to 150° C. for no more than 150 seconds.

11. A method of bonding two surfaces which comprises: contacting a first surface with the composition of claim 1 and curing the composition in contact with a second surface.

12. The method according to claim 11, wherein the curing comprises heating up to 150° C. for no more than 150 seconds.

13. The method according to claim 11, wherein at least one of the first and second surfaces is metal.

14. The method according to claim 13, wherein at least one of said first and second surfaces is contaminated with oil.

15. A composite article made by the method according to claim 11.

16. A prepreg comprising fibrous reinforcement and a composition according to claim 1.

* * * * *